United States Patent
Chu (10) Patent No.: US 9,059,635 B2
(45) Date of Patent: Jun. 16, 2015

(54) POWER CONVERTER CONTROL CIRCUIT (71) Applicant: Power Forest Technology, Hsinchu County (TW)

(72) Inventor: Kwan-Jen Chu, Hsinchu (TW)

(73) Assignee: POWER FOREST TECHNOLOGY, Zhubei (TW)

( * ) Notice: Subject to any disclaimer, the term of this patent is extended or adjusted under 35 U.S.C. 154(b) by 343 days.

(21) Appl. No.: 13/839,880

(22) Filed: Mar. 15, 2013

(65) Prior Publication Data
US 2014/0145635 A1 May 29, 2014

(30) Foreign Application Priority Data

Nov. 29, 2012 (TW) .............................. 101144747 A (51) Int. Cl.
- H05B 41/36 (2006.01)
- H02M 1/32 (2007.01)
- H05B 33/08 (2006.01)
- H02M 3/156 (2006.01)

(52) U.S. Cl.
CPC ................ *H02M 1/32* (2013.01); *Y02B 20/341* (2013.01); *H05B 33/0815* (2013.01); *H05B 33/0848* (2013.01); *H02M 3/156* (2013.01)

(58) Field of Classification Search
None
See application file for complete search history.

(56) References Cited

U.S. PATENT DOCUMENTS

| 7,525,256 | B2 * | 4/2009 | Ribarich et al. | 315/209 R |
| 8,531,163 | B2 * | 9/2013 | Chen | 323/285 |
| 8,618,747 | B2 * | 12/2013 | Park et al. | 315/307 |
| 2012/0120533 | A1 | 5/2012 | Huang et al. | |

FOREIGN PATENT DOCUMENTS

TW 201247026 A1 11/2012

* cited by examiner

*Primary Examiner* — Long Nguyen
(74) *Attorney, Agent, or Firm* — Muncy, Geissler, Olds & Lowe, P.C.

(57) ABSTRACT

Disclosed is a power converter control circuit, comprising at least a power converter circuit and a control circuit. The power converter circuit is able to boost up an input voltage into a greater driving voltage and supply it to the driven device. Moreover, the power converter circuit is also able to generate a voltage signal and a current-sense signal separately, and then combine them into a joint voltage/current-sense signal. The control circuit receives the joint voltage/current-sense signal and resolves it into an over-voltage signal and a current-sense signal with the aid of a modulation signal. The two signals are separately fed into an over-voltage protection device and an over-current protection device for comparison; the outcomes are utilized to execute the over-voltage protection and the over-current protection.

12 Claims, 7 Drawing Sheets

POWER CONVERTER CONTROL CIRCUIT

CROSS-REFERENCE TO RELATED APPLICATION

This application claims priority from Taiwan Patent Application No. 101144747, filed on Nov. 29, 2012 in Taiwan Intellectual Property Office, the contents of which are hereby incorporated by reference in their entirety.

BACKGROUND OF THE INVENTION

1. Field of the Invention

The present invention relates to a power converter control circuit, and particularly, a power converter control circuit with reduced pins.

2. Description of the Related Art

Recently, the fast development of the liquid-crystal display (LCD) has enabled the light-emitting diode (LED) backlight to gradually replace the traditional cold-cathode fluorescent lamps (CCFL) backlight.

Figure 1:
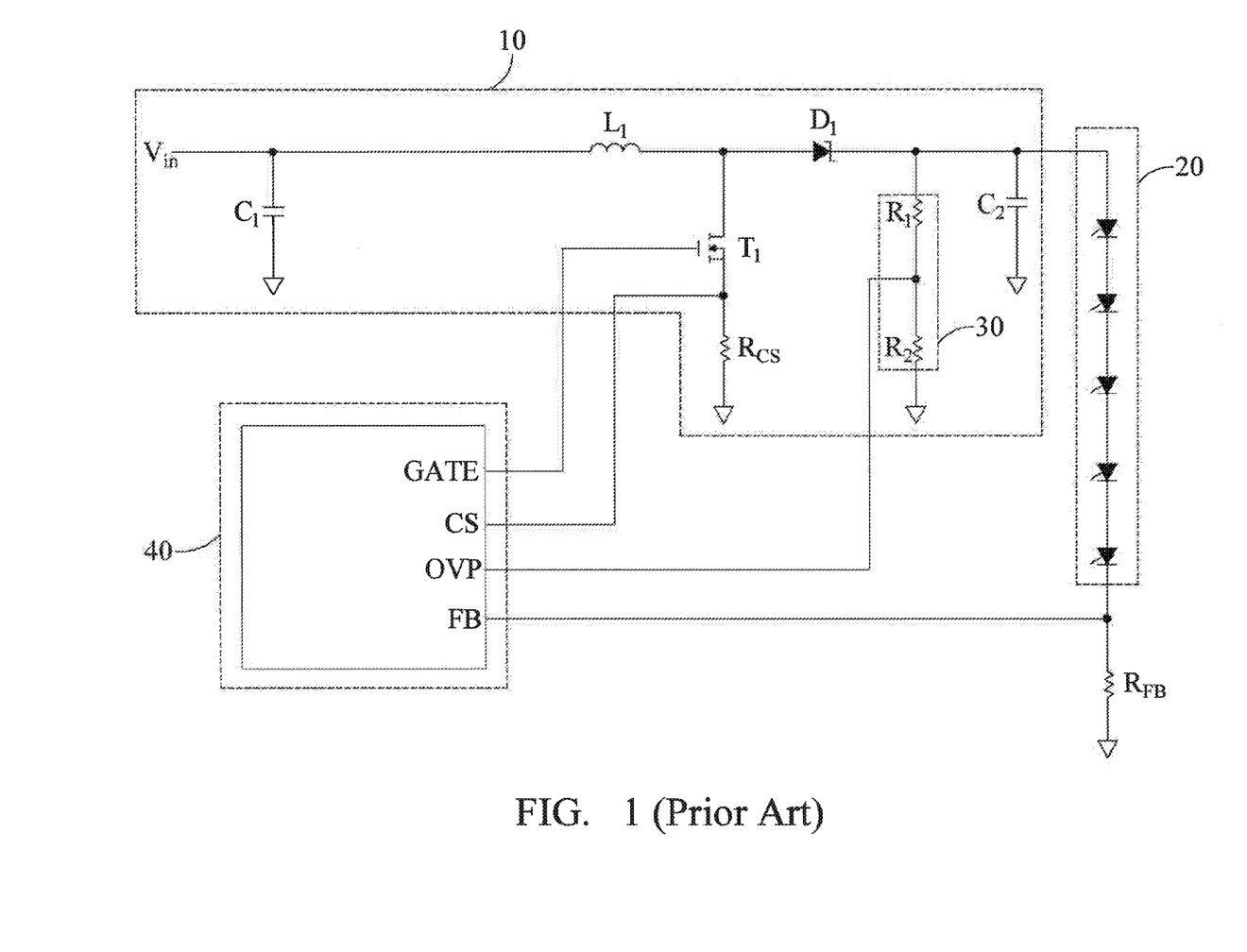
FIG. 1 is a circuit diagram showing a driving circuit with the boost-up capability of the prior arts.

Refer to FIG. 1, FIG. 1 shows the prior art of a light-emitting diode driving circuit with the boost-up function, comprising a boost-up circuit 10, a voltage division circuit 30, an integrated control circuit 40, a light-emitting diode 20, and a feedback resistor $R_{FB}$.

As a power transistor $T_1$ is turned on, an input voltage $V_{in}$ is bridged over a power saving device $L_1$, such that a current on a power saving device $L_1$ is increasing linearly with time and electrical energy is storing in the power saving device $L_1$. As the preset turn-on time is reached, the power transistor $T_1$ is shut down immediately, such that the electrical power saved in the power saving device $L_1$ is transmitted to the output of the boost-up circuit 10 through a diode $D_1$ and charged a capacitor $C_2$. The above procedures are repeated iteratively to boost up the input voltage $V_{in}$ to the preset threshold voltage level of the boost-up circuit 10. This is the principle of boosting voltage.

Furthermore, an output end of the boost-up circuit 10 is electrically connected in series to the light-emitting diode and the feedback resistor $R_{FB}$, wherein a non-grounded end of the feedback resistor $R_{FB}$ is electrically connected to the feedback signal pin FB of the control circuit 40. A feedback voltage of the feedback circuit is transmitted to the control circuit 40 and enables the control circuit 40 to transmit a control signal to a gate of the power transmitter $T_1$, such that a setup current can be generated.

Furthermore, the over-voltage protection method is by transmitting the output voltage of the boost-up circuit 10 through the voltage division circuit 30 to output a voltage division to the over-voltage signal pin OVP, then the voltage division is compared with a reference voltage of a over-voltage comparator (not shown) within the control circuit 40.

Besides, the current detection method is to enable a source of the power transistor $T_1$ to send a signal to the current detection signal pin CS via the over-current detection resistor $R_{CS}$.

SUMMARY OF THE INVENTION

If a pin number of a control circuit is limited, a traditional driving circuit with a boost-up function is unable to cope with this problem and apply to the aforementioned control circuit.

Based on the problem of the prior arts, one of the objects of the present invention is to offer a power converter control circuit to retain boost-up, current detection, and over-voltage protection functions under the conditions of limited expense and limited pins.

Thus, the present invention provides a power converter control circuit, comprising a power converter circuit and a control circuit. The power converter circuit comprises a power saving device and a power transistor, and connects to an external put voltage, wherein one end of the power saving device is electrically connected to the input voltage, a drain of the power transistor is electrically connected to the other end of the power saving device, and a gate of the power transistor receive a common modulation signal to enable the power transistor to generate an output voltage to an output. The control circuit is used to control an output voltage. The control circuit comprises a multi-function input, an over-current detection circuit, and an over-voltage detection circuit, wherein the multi-function input is electrically connected to the source and the output of the power transistor, and the over-current detection circuit and the over-voltage detection circuit receives the common modulation signal to be electrically connected to the multi-function input, respectively.

The power converter circuit further comprises a current detection resistor, a first resistor, a second resistor, the output, a first electrical node, and a ground. The drain of the power transistor is electrically connected to the output, the source of the power transistor and one end of the current detection resistor are electrically connected in common to the first electrical node, the other end of the current detection resistor is electrically connected to ground, one end of the first resistor is electrically connected to the multi-function input, the other end of the first resistor is electrically connected to the multi-function input, and two ends of the second resistor are electrically connected to the first electrical node and the multi-function input, respectively.

The over-current detection circuit comprises a current signal detector and a current detection signal output, wherein a first input of the current signal detector receives the common modulation signal, a second input of the current signal detector is electrically connected to the multi-function input, and an output of the current signal detector is electrically connected to the over-current detection signal output. The over-voltage detection circuit comprises an inverter, a control transistor, and an over-voltage signal, wherein an input of the inverter receives the common modulation signal, an output of the inverter is electrically connected to a gate of the control transistor, either one of a source/drain is electrically connected to the multi-function input, and the other one of the source/drain is electrically connected to the over-voltage signal output.

Furthermore, the common modulation signal is, for example, a pulse-width modulation (PWM) signal, and the control circuit is composed of an integrated circuit.

Furthermore, an over-voltage signal output and an over-current detection signal output are electrically connected respectively to non-inverting ends of an over-voltage protection comparator and an over-current protection comparator, wherein inverting inputs of the over-voltage protection comparator and the over-current protection comparator are electrically connected respectively to an over-voltage reference voltage and an over-current reference voltage.

Furthermore, the output of the power converter may be electrically connected in series to, for example, a driven device comprising at least a light-emitting diode and a grounded feedback resistor in sequence, wherein a non-grounded end of the feedback resistor is electrically connected to the control circuit.

Besides, the output of the power converter circuit may be electrically connected in series to multiple parallel-connected driven devices, where in the driven device comprises at least a light-emitting diode.

Besides, the output of the power converter circuit may be electrically connected in series to a driven device and a drain of a brightness control transistor, a source of the brightness control transistor is connected in series to a grounded feedback resistor, and the non-grounded end of the feedback resistor is electrically connected to the control circuit.

Furthermore, the aforementioned driving device is a light-emitting diode (LED) or a cold-cathode fluorescent lamp (CCFL).

As above-mentioned, the power converter control circuit of the present invention may have one or more characteristics and advantages as described below:
(1) The power converter control circuit of the present invention is able to combine the input pin of the current detection signal and the input pin of the over-voltage protection device into a single pin.
(2). The power converter control circuit of the present invention is able to enable the power converter control circuit to retain boost-up, current detection, and over-voltage protection functions under the conditions of limited expense and limited pins.

To increase further understanding of the technical characteristics and the efficacy of the present invention, preferred embodiments and detailed explanations are provided below.

DETAILED DESCRIPTION OF THE PREFERRED EMBODIMENTS

With reference to the drawings, thereafter, the preferred embodiments of a power converter control circuit in accordance with the present invention are illustrated. In order to be understood easily, the same components in the following embodiments are labeled as the same numeral.

The present invention provides a power converter control circuit, comprising at least a power converter circuit and a control circuit. The power converter control circuit of the present invention is able to boost up an input voltage and supply it to a driven device. Moreover, the power converter control circuit of the present invention is able to generate a voltage signal and a current detection signal separately, and combine the above two signals into a single voltage/current detection signal. The control circuit utilizes the modulation signal to match the voltage/current detection signal and resolves the voltage/current detection signal into the over-voltage signal and the current detection signal. The over-voltage signal and the current detection signal are transmitted to an over-voltage protection device and an over-current protection device, respectively, to compare with reference values. The comparison results are used to execute the over-voltage and over-current protections.

Figure 2:
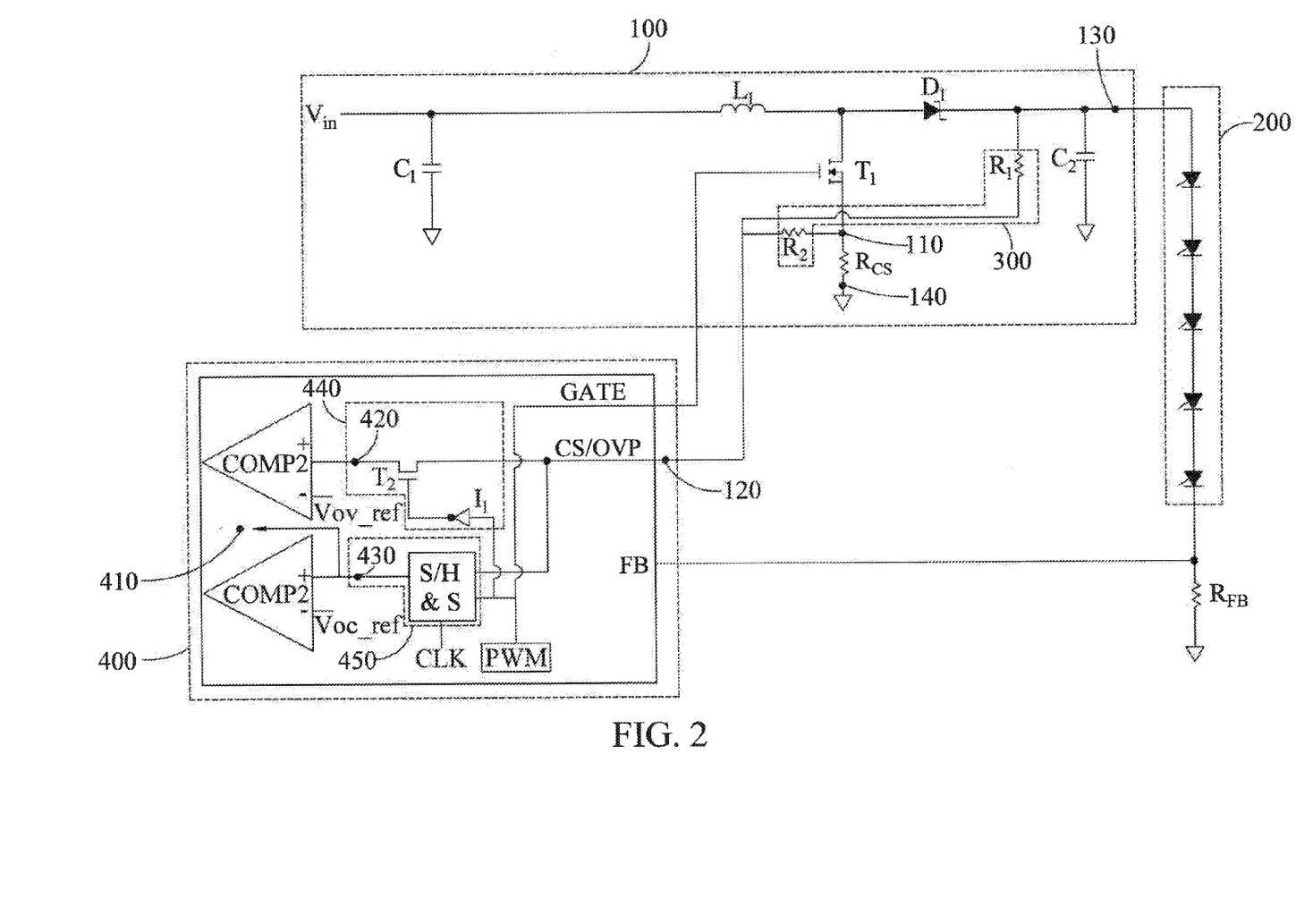
FIG. 2 is a circuit diagram showing a power converter control circuit according to the first embodiment of the present invention.
Figure 3:
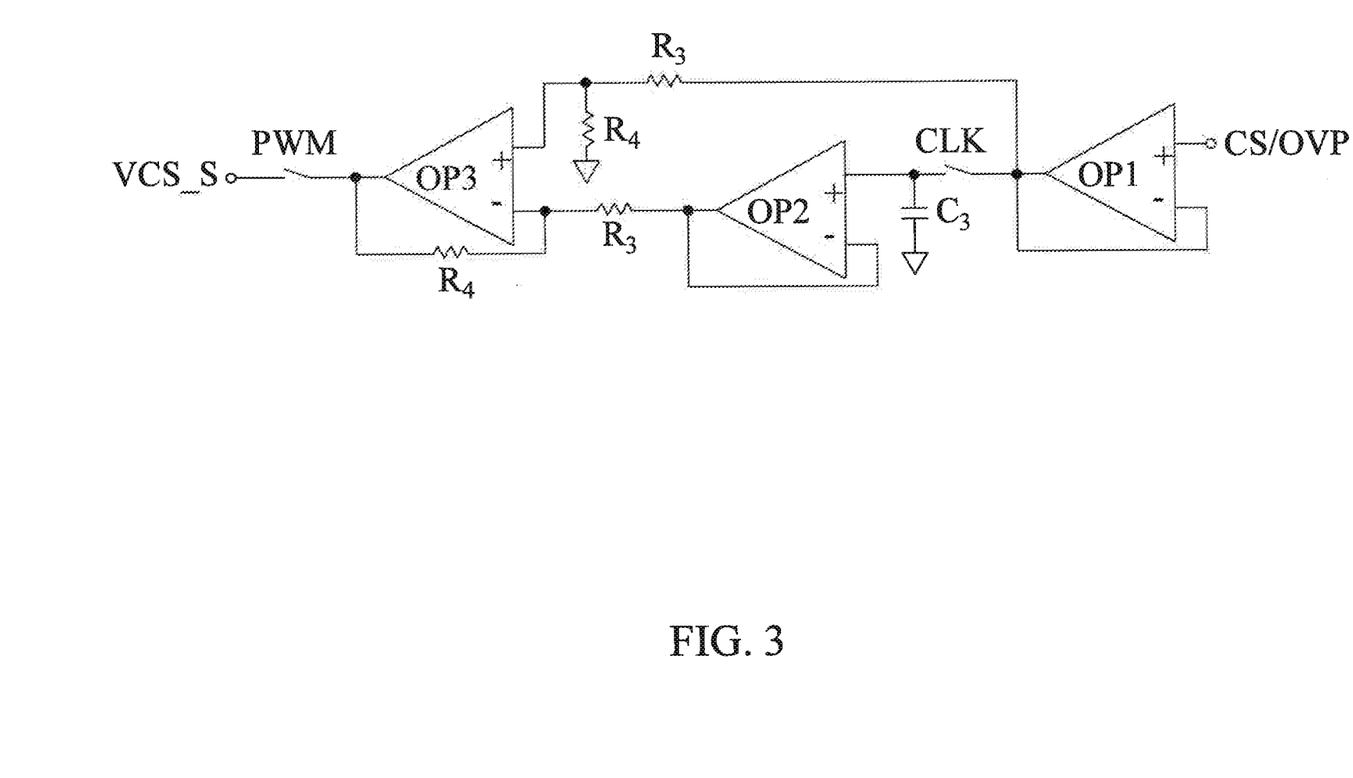
FIG. 3 is a pulse-width modulation signal diagram showing a power converter control circuit according to the present invention.
Figure 4:
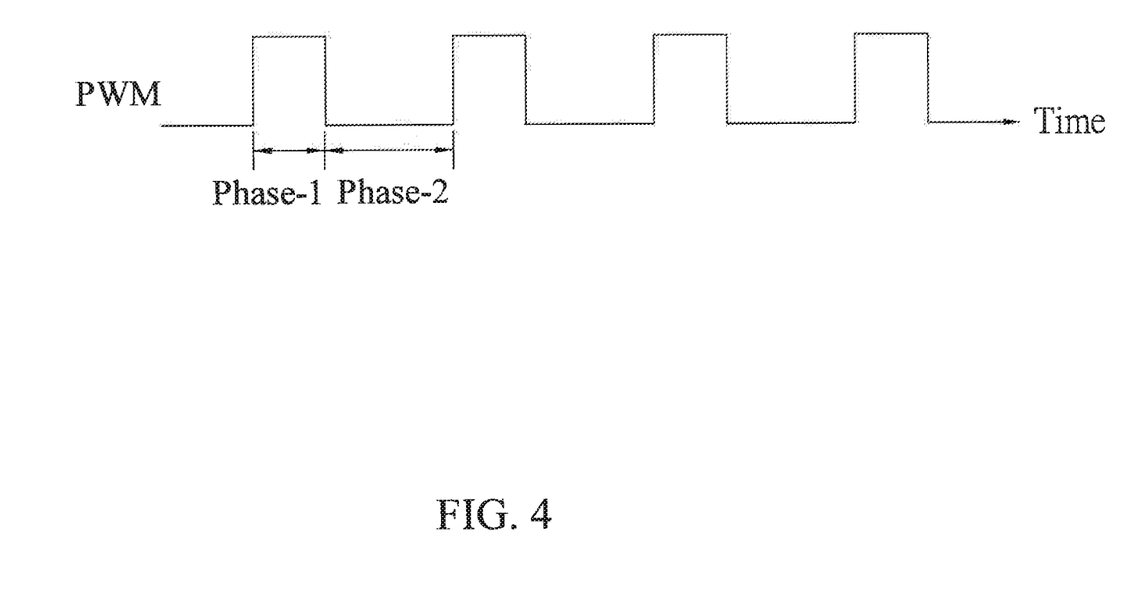
FIG. 4 is a signal processing diagram showing a power converter control circuit according to the present invention.

Refer to FIG. 2, FIG. 3 and FIG. 4, FIG. 2 is a circuit diagram showing a power converter control circuit according to the first embodiment of the present invention, FIG. 3 is a pulse-width modulation signal diagram showing a power converter control circuit according to the present invention, and FIG. 4 is a signal processing diagram showing a power converter control circuit according to the present invention.

The power converter control circuit of the present invention comprises a power converter circuit 100 and a control circuit 400. The power converter circuit 100 comprises a power saving device $L_1$, a power transistor $T_1$, a current detection resistor $R_{CS}$, a first resistor a second resistor $R_2$, a first electrically node 110, an output 130, and a ground 140, and also connects to an external input voltage $V_{in}$. Moreover, one end of the power saving device $L_1$ is electrically connected to the input voltage $V_{in}$, a drain of the power transistor $T_1$ is electrically connected to the other end of the power saving device $L_1$, a source of the power transistor $T_1$ and one end of the current resistor $R_{CS}$ are both electrically connected to the first electrically node 110, a gate of the power transistor $T_1$ receives a common modulation signal, for example, a pulse-width modulation (PWM), to generate the output voltage, and the other end of the current detection resistor $R_{CS}$ is electrically connected to the ground 140. One end of the first resistor $R_1$ is electrically connected to the output 130, and one end of the second resistor is electrically connected to the first electrically node 110. The output 130 is electrically connected in series to a driven device 200, for example, at least a light-emitting diode or a cold-cathode fluorescent diode, and the grounded feedback resistor $R_{FB}$, and the non-grounded end of the feedback resistor $R_{FB}$ is electrically connected to the feedback signal pin FB of the control circuit 400.

Moreover, the output voltage of the power converter circuit 100 is transmitted to the voltage division circuit 300 to generate a voltage division, the voltage division is combined with the output signal of the power converter circuit 100 regulated by the power transistor $T_1$ and voltage divided by the current detection resistor $R_{CS}$ to become a current detection/over-voltage signal, then the current detection/over-voltage signal is transmitted to the control circuit 400 through the multi-function input.

Furthermore, the control circuit 400 comprises the multi-function input 120, an over-current detection circuit 450, and an over-voltage detection circuit 440. The other end of the first resistor $R_1$ and the other end of the second resistor $R_2$ are electrically connected in common to the multi-function input 120. The over-voltage detection circuit 440 comprises an inverter $I_1$, a control transistor $T_2$, and an over-voltage signal output 420. A input of the inverter $I_1$ receives the common pulse-width modulation signal PWM, an output of the inverter $I_1$ is electrically connected to a gate of the control transistor $T_2$, either one of a source/drain of the control transistor $T_2$ is electrically connected to the multi-function input 120, and the other one of the source/drain of the control transistor $T_2$ is electrically connected to the over-voltage signal output 420. The over-current detection circuit 450 comprises a current signal detector S/H&S and a current detection signal output 430. A first input of the current signal detector S/H&S receives the common pulse-width modulation signal PWM, a second input of the current signal detector S/H&S is electrically connected to the multi-function input 120, and an output of the current signal detector is electrically connected to the over-current detection signal output 430.

As shown in FIG. 3 and FIG. 4, the state of the pulse-width modulation signal PWM is on during the current detection period Phase-1. Therefore, the power transistor $T_1$ will be activated to generate the output signal, the current signal detector S/H&S will cooperate with the pulse-width modulation signal PWM and the clock CLK to sample the input signal of the multi-function input 120, remove the over-voltage signal to obtain the pure over-current detection signal $V_{CS\_S}$, and transmit the over-current detection signal $V_{CS\_S}$ to the over-current detection signal output 430. Meanwhile, the pulse-width modulation signal PWM is inverted after passing through the inverter I1 and transmitted to a gate of the control transistor $T_2$ to shut down the output of the control transistor $T_2$. The state of the pulse-width modulation signal PWM is off during the current detection period Phase-2. Therefore, the power transistor power transistor $T_1$ will shut down the output signal such that the current detection/over-voltage signal remains only the voltage division portion generated by the voltage division circuit 300, and the pulse-width modulation signal PWM is turned into on after passing through the inverter $I_1$ and transmitted to the gate of the control transistor $T_2$ to output the output voltage division signal to the over-voltage signal output 420. Meanwhile, the pulse-width modulation signal PWM will shut down the output of the current signal detector S/H&S.

Figure 5:
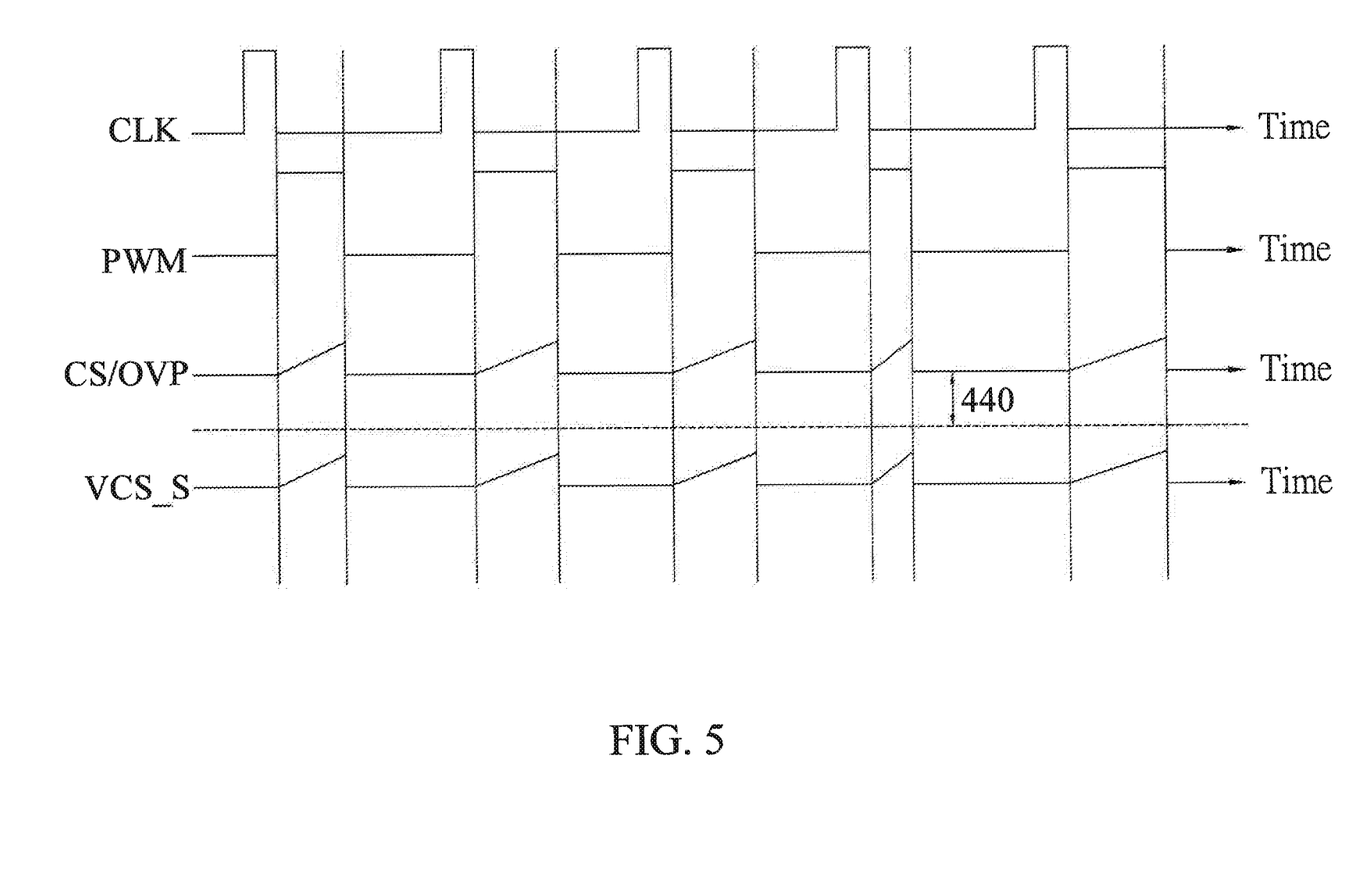
FIG. 5 is a diagram of a current signal detector showing a power converter control circuit according to the present invention.

Furthermore, FIG. 5 is a diagram of a current signal detector showing a power converter control circuit according to the present invention. In FIG. 5 the comparator OP1, the second comparator OP2, the clock CLK, the third capacitor $C_3$, and the accompanied circuit altogether constitute the current signal detector S/H&S, wherein the clock CLK is used to control the sampling frequency and the third capacitor $C_3$ is used to preserve the sampling value. The third comparator OP3, the resistor $R_3$, the fourth resistor $R_4$, and the accompanied circuit constitute the subtraction circuit, the function of the subtraction circuit is to remove the over-voltage signal level 440, and the output of the subtraction circuit is regulated by the pulse-width modulation signal PWM to generate the over-current detection signal $V_{CS\_S}$.

As shown in FIG. 2, the over-voltage signal output 420 and the over-current detection signal output 430 are electrically connected to the non-inverting inputs of the over-voltage protection comparator COMP1 and the over-current protection comparator COMP2, respectively. The inverting inputs of the over-voltage protection comparator COMP1 and the over-current protection comparator COMP2 are electrically connected to the over-voltage reference voltage $V_{ov\_ref}$ and the over-current reference voltage $V_{ov\_ref}$, respectively. If the over-voltage signal level delivered by the over-voltage signal output 420 is higher than the over-voltage reference voltage $V_{ov\_ref}$, the over-voltage protection comparator COMP1 will send out an enabled control signal. Otherwise, the over-voltage protection comparator COMP1 will send out a disabled control signal. Similarly, if the over-current detection signal $V_{CS\_S}$ delivered by the over-current detection signal output 430 is higher than the over-current reference voltage $V_{oc\_ref}$, the over-current protection comparator COMP2 will send out an enabled control signal. Otherwise, the over-current protection comparator COMP2 will send out a disabled control signal. The over-current detection signal output 430 is electrically connected to the summed slope compensation circuit 410 to execute the subsequent processing of the over-current detection signal.

Figure 6:
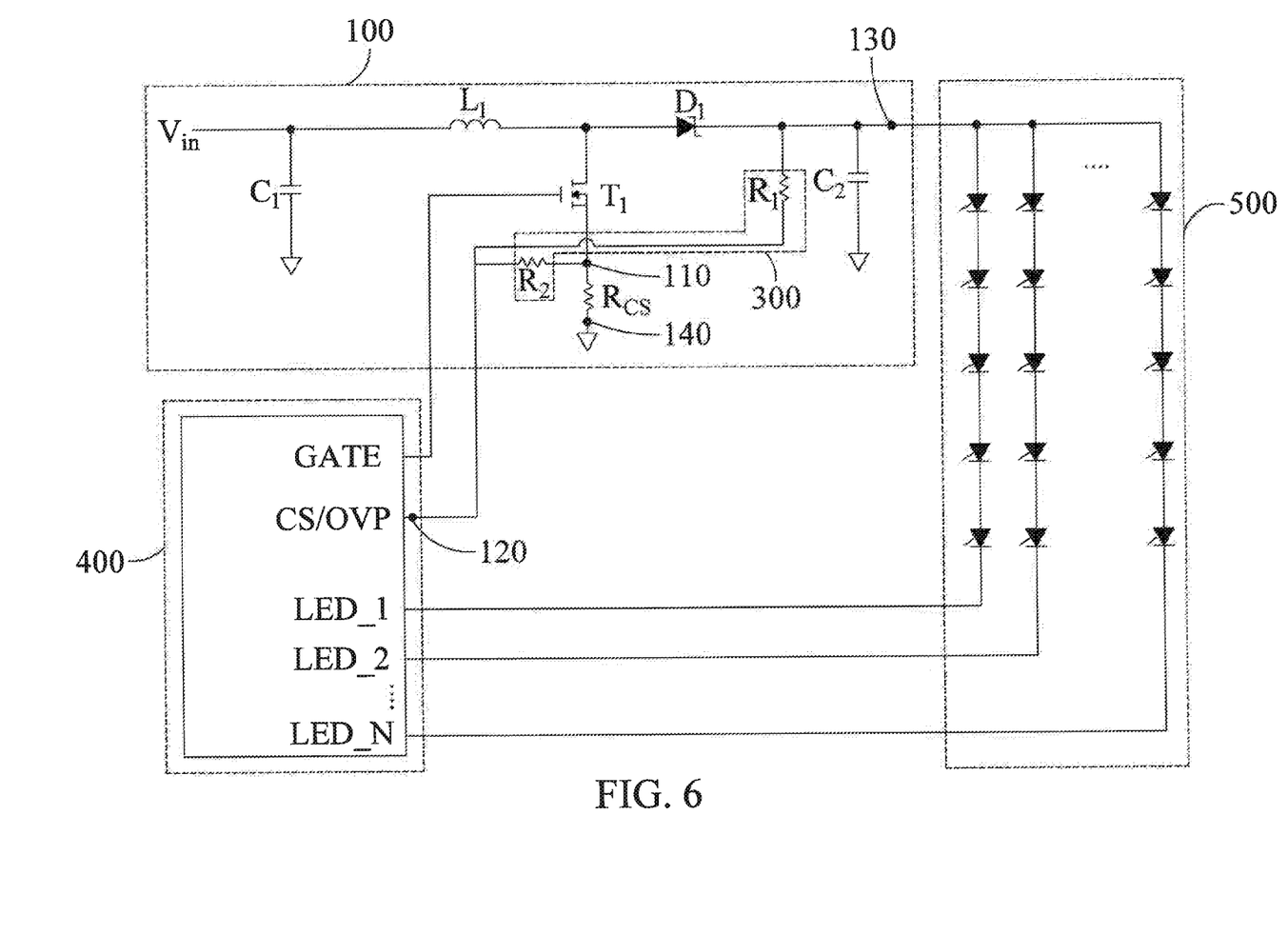
FIG. 6 is a circuit diagram showing a power converter control circuit according to the second embodiment of the present invention.

Refer to FIG. 6, FIG. 6 is a circuit diagram showing a power converter control circuit according to the second embodiment of the present invention. In FIG. 6, the output of the power converter is electrically connected in series to a plurality of a parallel connected driven device 500, wherein the driven device 500 comprises, for example, at least a light-emitting diode or a cold-cathode fluorescent lamp.

Figure 7:
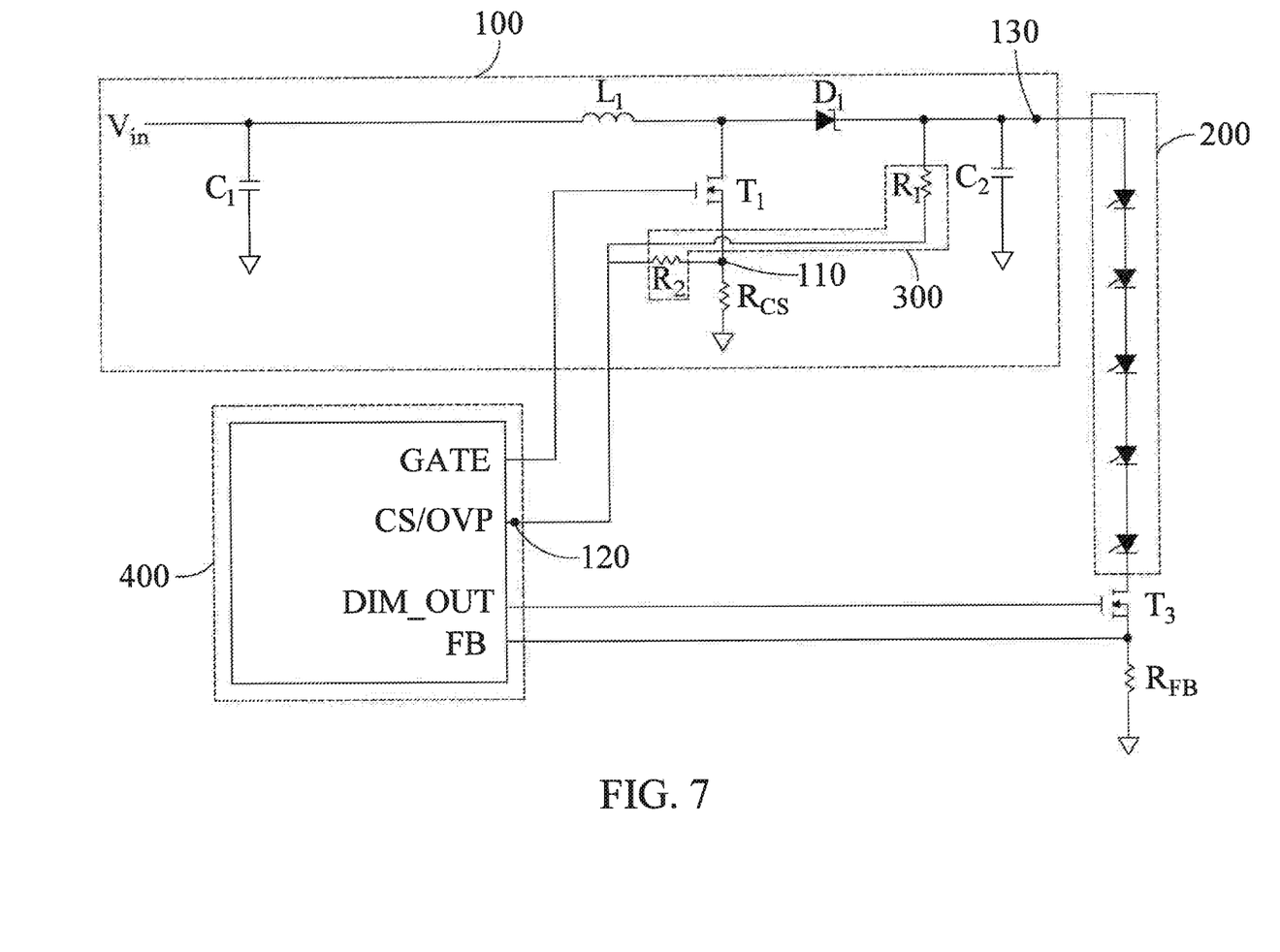
FIG. 7 is a circuit diagram showing a power converter control circuit according to the third embodiment of the present invention.

Refer to FIG. 7, FIG. 7 is a circuit diagram showing a power converter control circuit according to the third embodiment of the present invention. In FIG. 7, the output of the converter circuit 100 is electrically connected in series to a driven device 200, for example, at least a light-emitting diode or a cold-cathode fluorescent lamp, and a drain of the brightness control transistor $T_3$, wherein a source of the brightness control transistor $T_3$ is electrically connected in series to the grounded feedback resistor $R_{FB}$, and the non-grounded end of the feedback resistor $R_{FB}$ is electrically connected to the control circuit 400.

In summary, the power converter control circuit of the present invention combines the CS pin and the OVP pin into a multi-function input pin CS/OVP, such that the power converter control circuit to retain boost-up, current detection, and over-voltage protection functions under the conditions of limited expense and limited pins.

In summation, although the present invention has been described with reference to the foregoing preferred embodiments, it will be understood that the invention is not limited to the details thereof. Various equivalent variations and modifications may still occur to those skilled in this art in view of the teachings of the present invention. Thus, all such variations and equivalent modifications are also embraced within the scope of the invention as defined in the appended claims.

What is claimed is:

1. A power converter control circuit, comprising:
a power converter circuit, used to generate an output voltage; the power converter circuit comprising an energy saving device and a power transistor and connects to an external input voltage, wherein one end of the energy saving device is electrically connected to the input voltage, a drain of the power transistor is electrically connected to the other end of the energy saving device, and a gate of the power transistor receives a modulation signal to enable the power transistor to generate an output voltage to an output; and
a control circuit, used to control the output voltage; the control circuit comprises a multi-function input, an over-current detection circuit, and an over-voltage detection circuit, wherein the multi-function input is electrically connected to a source of the power transistor and the output, the over-current detection circuit and the over-voltage detection circuit respectively receive the modulation signal and is electrically connected to the multi-function input.

2. The power converter control circuit of claim 1, further comprising a current detection resistor, a first resistor, a second resistor, the output, a first electrical node, and a ground, wherein the drain of the power transistor is electrically connected to the output, the source of the power transistor and one end of the current detection resistor are commonly electrically connected to the first electrical node, the other end of the current detection resistor is electrically connected to the ground, one end of the first resistor is electrically connected to the output, the other end of the first resistor is electrically connected to the multi-function input, and two ends of the second resistor are electrically connected to the first electrical node and the multi-function input, respectively.

3. The power converter control circuit of claim 2, wherein the over-current detection circuit further comprises a current signal detector and an over-current detection signal output, wherein a first input of the current signal detector receives the modulation signal, a second input of the current signal detector is electrically connected to the multi-function input, and an output of the current signal detector is electrically connected to the over-current detection signal output; the over-voltage detection circuit further comprises an inverter, a control transistor, and an over-voltage signal output, wherein an input of the inverter receives the modulation signal, an output of the inverter is electrically connected to a gate of the control transistor, either one of a source/drain of the control transistor is electrically connected to the multi-function input, and the other one of the source/drain is electrically connected to the over-voltage signal output.

4. The power converter control circuit of claim 3, wherein the over-voltage signal output and the over-current detection signal output are electrically connected to an over-voltage protection comparator and a non-inverting input of an over-current protection comparator, respectively, wherein the over-voltage protection comparator and the inverting input are input with an over-voltage reference voltage and over-current reference voltage.

5. The power converter control circuit of claim 2, wherein the output of the power converter circuit is electrically connected in series to a driven device and a grounded feedback resistor in sequence, wherein the non-grounded end of the feedback resistor is electrically connected to the control circuit.

6. The power converter control circuit of claim 2, wherein the output of the power converter circuit is electrically connected in series to multiple parallel-connected driven devices.

7. The power converter control circuit of claim 2, wherein the output of the power converter circuit is electrically connected in series to a driven device and either one of a source/drain of a brightness control transistor, the other one of the source/drain of the brightness control transistor is connected in series to a grounded feedback resistor, and the non-grounded end of the feedback resistor is electrically connected to the control circuit.

8. The power converter control circuit of claim 3, wherein the control circuit is composed of an integrated circuit.

9. The power converter control circuit of claim 3, wherein the modulation signal is a pulse-width modulation (PWM) signal.

10. The power converter control circuit of claim 5, wherein the driven device is a light-emitting diode (LED) or a cold-cathode fluorescent lamp (CCFL).

11. The power converter control circuit of claim 6, wherein the driven device is a light-emitting diode (LED) or a cold-cathode fluorescent lamp (CCFL).

12. The power converter control circuit of claim 7, wherein the driven device is a light-emitting diode (LED) or a cold-cathode fluorescent lamp (CCFL).

* * * * *